United States Patent [19]

Hooper et al.

[11] Patent Number: 4,669,922
[45] Date of Patent: Jun. 2, 1987

[54] DELIVERY BOOT FOR PNEUMATIC DELIVERY SYSTEMS FOR GRAIN AND/OR GRANULAR FERTILIZER

[76] Inventors: James D. Hooper; Ronald D. Hooper, both of Box 58, Waskada, Manitoba, Canada, R0M 2E0

[21] Appl. No.: 809,401

[22] Filed: Dec. 16, 1985

[30] Foreign Application Priority Data

Feb. 19, 1985 [CA] Canada ................................. 474686

[51] Int. Cl.⁴ .......................................... B65G 53/40
[52] U.S. Cl. .................................... 406/157; 111/86
[58] Field of Search ................ 406/83, 154, 157, 162, 406/155, 175; 239/654, 655, 124; 111/86, 34

[56] References Cited

U.S. PATENT DOCUMENTS

| | | | |
|---|---|---|---|
| 1,564,083 | 12/1925 | Lyons | 111/86 |
| 1,818,367 | 8/1931 | Wallace | 406/154 |
| 2,292,909 | 8/1942 | Thoma et al. | 111/86 |
| 2,885,978 | 5/1959 | Miller | 111/86 |
| 4,276,836 | 7/1981 | Pust | 111/86 |
| 4,493,273 | 1/1985 | Gauchet et al. | 111/86 |
| 4,569,486 | 2/1986 | Balmer | 239/655 |

*Primary Examiner*—Jeffrey V. Nase
*Attorney, Agent, or Firm*—S. G. Ade

[57] ABSTRACT

A baffled receiver is situated at the discharge end of a pneumatic fertilizer or seed delivery tube and includes an air discharge or relief portion and a baffle system to receive and guide the seed or fertilizer to a pair of discharge apertures adjacent the base. The baffles and air relief portion even out the flow of material which exits in relatively even amounts through the apertures and onto a V-shaped divider which splits the flow into two streams for delivery into a furrow. It is bolted to the shank at the rear side thereof and just above the cultivator or other ground opening tool on the lower end of the shank. The air discharge or relief plate relieves the pressure of the air stream thus allowing the seed or fertilizer to flow by gravity to the discharge apertures.

16 Claims, 8 Drawing Figures

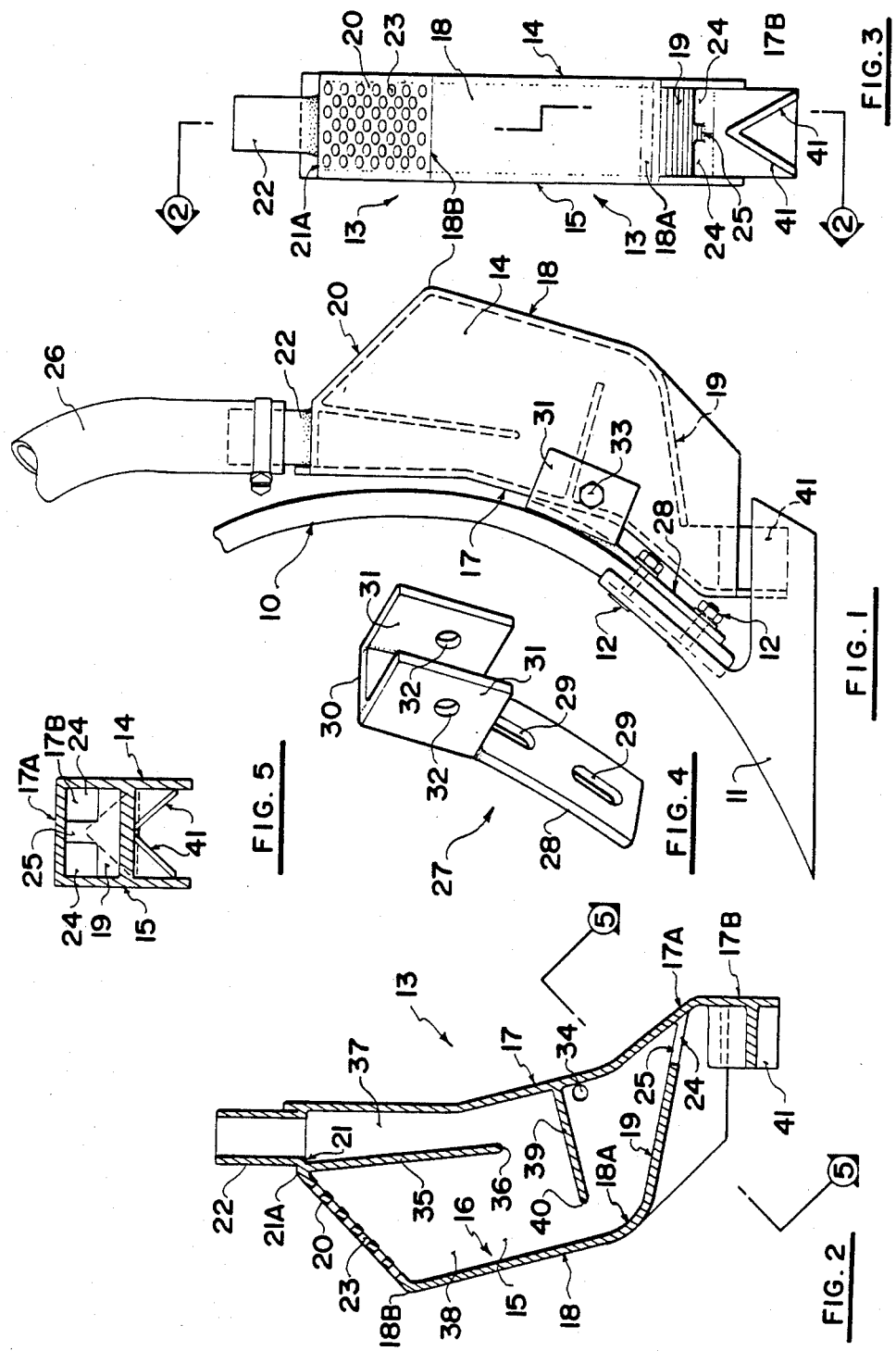

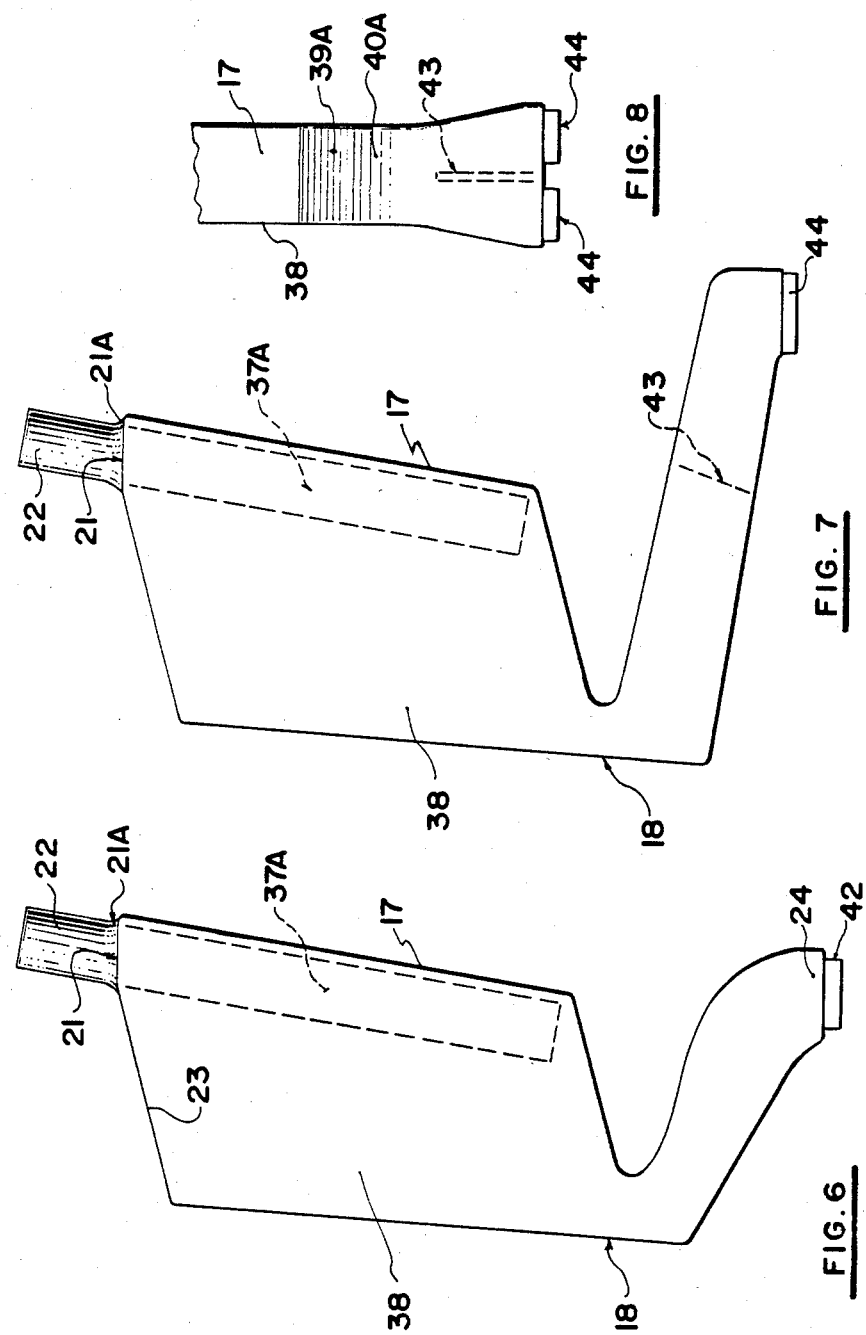

DELIVERY BOOT FOR PNEUMATIC DELIVERY SYSTEMS FOR GRAIN AND/OR GRANULAR FERTILIZER

BACKGROUND OF THE INVENTION

The invention relates to new and useful improvements in delivery boots for pneumatic delivery systems used on cultivators or the like for the delivery of grain and/or granular fertilizer or other comminuted materials.

Conventional systems entrain the material in air under pressure which discharges with some considerable force thus causing the seed or comminuted material to bounce under certain circumstances and scatter undesirably.

The present invention overcomes these disadvantages by delivering the air under pressure with the entrained material, to an expansion boot prior to discharge with the boot including means to relieve the air pressure and thus allow the seed or other material to be deposited by gravity rather than by air pressure. This not only evens up the flow of material to the discharge but also prevents bouncing and scattering of the seed or material.

SUMMARY OF THE INVENTION

In accordance with the invention there is provided a delivery boot system including a delivery tube for carrying material such as seed and/or fertilizer entrained in air under pressure, said boot being attachable to an associated grand engaging tool carrying shank; said boot comprising in combination an enclosure, an inlet for said enclosure adjacent the upper end thereof, for connecting to the associated tube, an outlet for said enclosure adjacent the lower end thereof, air discharge means in said enclosure remote from said outlet and baffle means in said enclosure for separating the entrained material from the air under pressure whereby said material is directed to said outlet and said air is directed towards said air discharge means.

Another advantage of the invention is to provide a device of the character herewithin described which includes a deflector adjacent the discharge which divides the discharging grain or material into two substantially even streams one upon each side thereof prior to deposition into the furrow.

Another advantage of the invention is that it can be secured readily to existing air seeders or other pneumatic devices utilizing the bolts holding the ground working tools to the shanks.

A yet further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming apart hereof, which includes a description of the best mode known to the applicant and of the preferred typical embodiment of the principles of the present invention, in which:

DESCRIPTION OF THE DRAWINGS

FIG. 1 is a fragmentary side elevation of a cultivator shovel and shank with the invention secured thereto.

FIG. 2 is a vertical cross-section of one of the boots along the line 2—2 of FIG. 3.

FIG. 3 is a rear elevation of FIG. 2.

FIG. 4 is an isometric view of the attaching clamp per se.

FIG. 5 is a cross-sectional view along the line 5—5 of FIG. 2.

FIG. 6 is a side elevational showing an alternative embodiment of the device.

FIG. 7 is a view similar to FIG. 6 but showing a different outlet construction.

FIG. 8 is a fragmentary front view of FIG. 7.

In the drawings like characters of reference indicate corresponding parts in the different figures.

DETAILED DESCRIPTION

Proceeding therefore to describe the invention in detail, reference should first be made to FIG. 1 in which 10 illustrates a cultivator shank or a shank for other ground working tools, having a cultivator showel 11 secured on the lower end thereof by means of bolts 12 in the usual manner.

The invention collectively designated 13 is secured to the rear of the shank 10 by means of the bolts 12 as will hereinafter be described.

The boot 13 consists of a pair of spaced and parallel side walls 14 and 15 together with a perimetrical wall collectively designated 16 secured as by welding to the edges of the side plates 14 and 15 to form an enclosure. The perimetrical wall 16 includes a front portion 17, a rear portion 18 and a lower portion 19 extending from the lower end 18A of the rear portion and curving downwardly and forwardly to the lower end 17A of the front portion. An upper portion 20 extends from the upper end 18B of the rear portion 18 and inclines upwardly and forwardly towards a junction portion 21 into which an inlet conduit 22 is secured and it will be noted that the upper portion 20 is perforated with a plurality of apertures 23 which acts as an air discharge for the enclosure.

This upper portion 20 inclines upwardly and forwardly from the point 18B to the junction 21 as clearly shown in FIG. 2.

The front end of the lower portion 19 is provided with a pair of apertures 24 one upon each side of a central strip 25 (See FIG. 5) and these apertures constitute the discharge means for the discharge of grain or other material by gravity as will hereinafter be described.

It will be noted that the conventional pneumatic tube 26 engages over the conduit 22 and is clamped thereto in a conventional manner.

As mentioned previously, the boot 13 is secured to the rear of the shank by the bolts 12 and in this connection, a clamp assembly 27 is provided. It consists of a curved strip 28 having a pair of elongated slots 29 formed therein and a U-shaped clamping portion 30 formed on the upper end by a pair of spaced and parallel ears 31 extending rearwardly from the upper end of the strap 28, said ears being apertured as at 32.

The bolts 12 engage through the apertures 29 and clamp the strap to the shank as well as clamping the cultivator shovel 11 thereto. The ears embrace each side of the boot when in position and a bolt assembly 33 engages through the apertures in the ears 31 and through apertures 34 formed in the two side plates 14 and 15 of the boot thus holding the boot firmly in position on the rear of the shank as clearly shown in FIG. 1. It will be noticed that the curvature of the front wall 17 of the enclosure matches substantially the curvature of the potion of the shank against which it engages.

Reference to FIG. 2 will show a pair of baffles within the enclosure. The first baffle is a substantially vertical baffle 35 extending between the two side plates 14 and 15 and being secured adjacent the junction 21A of the upper portion 20 and the portion 21 carrying the conduit 22. The vertical baffle extends downwardly and terminates at a location 36 thus dividing the portion of the enclosure into which the vertical baffle extends, into an inlet throat portion 37 and an air discharge portion 38.

A substantially transversely situated baffle 39 also extends between the side plates 14 and 15 and is secured to the front wall 17 as shown in FIG. 2. It extends towards the rear wall 18 but terminates spaced therefrom at a position indicated by reference character 40 and it will be noted that the termination of the vertical baffle 35 at point 36 is spaced above the baffle 39 and substantially intermediate the ends thereof.

In operation, air under pressure together with entrained material enters the conduit 22 from the tube 26 and passes downwardly through the inlet throat portion 37 and strikes the baffle 39. This baffle 39 deflects the air under baffle 35 and upwardly into the air discharge portion 38 and then through the perforations 23 to atmosphere.

The material striking the baffle 39 loses its inertia and flows by gravity down the slight slope of the baffle 39 and between the point 40 and the rear wall to continue to flow by gravity downwardly along the accurately curved lower portion of the rear wall to the discharge apertures 24 which acts as a primary divider, dividing the material into two substantially equal streams.

Under some circumstances, this is sufficient division of the material but if more accuracy of division is required, then a V-shaped deflector 41 is provided below the discharge apertures 24. A continuation of the front wall 17, at 17B, acts as a shield depending downwardly from the front of the boot to prevent soil being moved by the shovel 11, from interfering with the deposition of the seed or other material and the deflector 41 may be welded to this sheild 17B centrally thereof as shown in FIG. 3. This again divides the flow outwardly into each side of the furrow.

It will of course be appreciated that the total cross-sectional area of the apertures of perforations 23 should be sufficient to not cause any back pressure to air discharging therethrough.

FIGS. 6, 7 and 8 show modifications to the structure thus enabling same to be manufactured by rotational molding techniques which of course lowers the cost of production.

Where applicable, similar numerals have been used and it will be noted that the principal difference is in the configuration of the side panels or side walls 14 and 15 together with a change to the perimetrical wall 16.

The side panels include the front portion 17 which then inclines downwardly and rearwardly as at 39A and terminates at a point 40A spaced from the rear portion 18 of the perimetrical wall. It then inclines in a gradual curve, forwardly and downwardly to the discharge aperture or apertures 24. The portions 39A therefore takes the place of the substantially transversely extending baffle 39 hereinbefore described and, as mentioned previously, enables the device to be rotational molded from synthetic plastic rather than been formed from metal.

When rotational molding the device, it is difficult to incorporate the substantially vertical baffle 35 so that in this embodiment, a conduit 37A extends through the inlet area 21 and forms an extension of the inlet conduit 22. This is engaged after the boot has been rotational molded and is then cemented in position as indicated by reference character 21A.

This conduit 37A terminates at a point just above the portion 39A shown clearly in FIG. 6 and thus acts as the vertical component 35 of the baffle means and in fact constitutes the inlet throat portion 37 hereinbefore described. The remaining portion of the enclosure above baffle portion 39A therefore becomes the air discharge portion 38.

The operation is similar to that hereinbefore described inasmuch as the grain impinges upon the baffle portion 39A and then flows by gravity over the end 40A to the discharge with the air discharging through apertures 23 as hereinbefore described.

The discharge area can be similar to that hereinbefore described or may terminate in a collar 42. Alternatively, a divider 43 may be engaged within the discharge end and a pair of diverging discharge collars 44 may extend one upon each side thus spreading the grain and or fertilizer into two streams which flow by gravity into the furrow formed by the ground working tool 11.

It will of course be appreciated that similar discharge structure to that hereinbefore described may also be utilized with this boot construction and that this particular boot construction illustrated in FIGS. 6, 7 and 8 are particularly applicable to boots formed from synthetic plastic and specifically formed by rotational molding processes.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A delivery boot for pneumatic delivery systems, said delivery system including a delivery tube for carrying material such as seed and/or fertilizer entrained in air under pressure, said boot being attachable to an associated ground engaging tool carrying shank; said boot comprising in combination an enclosure including a front wall, a rear wall and sides, an inlet for said enclosure adjacent the upper end thereof, for connecting to the associated tube, an outlet for said enclosure adjacent the lower end thereof, air discharge means in said enclosure remote from said outlet and baffle means in said enclosure for separating the entrained material from the air under pressure whereby said material is directed to said outlet and said air is directed towards said air discharge means, said baffle means including a substantially vertical baffle extending from between said inlet and said air discharge means, downwardly towards the lower end of said enclosure but terminating at a point spaced above said lower end, said substantially vertical baffle dividing the portion of said enclosure into which said vertical baffle extends, into an inlet throat portion and an air discharge portion, said baffle means also including a substantially transversely situated baffle extending between said sides and partially across said enclosure and inclining slightly downwardly from the front wall of the enclosure towards the rear wall thereof to receive said material and slow down the velocity thereof and to deflect the air towards said air discharge means, said material moving by gravity downwardly towards said outlet.

2. The boot according to claim 1 in which said enclosure includes a pair of spaced and parallel side plates and a perimetrical wall joining said side plates by the edges thereof, said wall when viewed in side elevation including a front portion, a rear portion, a lower portion extending from the lower end of said rear portion and curving downwardly and forwardly to the lower end of said front portion and an upper portion extending from the upper end of said rear portion and inclining upwardly and forwardly towards the upper end of said front portion, said upper portion being perforated and constituting said air discharge means, said inlet being situated at the junction between said upper portion and said front portion, said outlet being situated in the lower end of said rear portion adjacent the junction thereof to said front portion.

3. The boot according to claim 2 in which said inlet includes a downwardly extending conduit secured to said inlet means and having an open lower end, said conduit terminating at a point spaced above said transversely situated baffle and constituting part of said baffle means, and acting as an inlet throat portion with the remainder of said enclosure above said transversely situated baffle means constituting an air discharge portion.

4. The boot according to claim 3 in which said enclosure includes said front portion inclining downwardly and rearwardly towards said rear portion but terminating spaced therefrom and then inclining downwardly and forwardly towards said discharge, said downwardly and rearwardly inclining portion constituting part of said baffle means.

5. The boot according to claim 1 in which said outlet includes a pair of apertures, a V-shaped deflector situated below said apertures for dividing the material into two distinct streams, and shield means extending downwardly from the lower end of said enclosure forwardly of said V-shaped deflector.

6. The boot according to claim 1 in which said inlet includes a downwardly extending conduit secured to said inlet means and having an open lower end, said conduit terminating at a point spaced above said transversely situated baffle and constituting part of said baffle means, and acting as an inlet throat portion with the remainder of said enclosure above said transversely situated baffle means constituting an air discharge portion.

7. The boot according to claim 6 in which said enclosure includes a pair of spaced and parallel side plates and a perimetrical wall joining said side plates by the edges thereof, said wall when viewed in side elevation including a front portion, a rear portion, a lower portion extending from the lower end of said rear portion and curving downwardly and forwardly to the lower end of said front portion and an upper portion extending from the upper end of said rear portion and inclining upwardly and forwardly towards the upper end of said front portion, said upper portion being perforated and constituting said air discharge means, said inlet being situated at the junction between said upper portion and said front portion, said outlet being situated in the lower end of said rear portion adjacent the junction thereof to said front portion.

8. The boot according to claim 7 in which said enclosure includes said front portion inclining downwardly and rearwardly towards said rear portion but terminating spaced therefrom and then inclining downwardly and forwardly towards said discharge, said downwardly and rearwardly inclining portion constituting part of said baffle means.

9. The boot according to claim 6 in which said enclosure includes a pair of spaced and parallel side plates and a perimetrical wall joining said side plates by the edges thereof, said wall when viewed in side elevation including a front portion, a rear portion, a lower portion extending from the lower end of said rear portion and curving downwardly and forwardly to the lower end of said front portion and an upper portion extending from the upper end of said rear portion and inclining upwardly and forwardly towards the upper end of said front portion, said upper portion being perforated and constituting said air discharge means, said inlet being situated at the junction between said upper portion and said front portion, said outlet being situated in the lower end of said rear portion adjacent the junction thereof to said front portion, said front portion inclining downwardly and rearwardly towards said rear portion but terminating spaced therefrom and then inclining downwardly and forwardly towards said discharge, said downwardly and rearwardly inclining portion constituting part of said baffle means.

10. The boot according to claim 6 in which said enclosure includes a pair of spaced and parallel side plates and a perimetrical wall joining said side plates by the edges thereof, said wall when viewed in side elevation including a front portion, a rear portion, a lower portion extending from the lower end of said rear portion and curving downwardly and forwardly to the lower end of said front portion and an upper portion extending from the upper end of said rear portion and inclining upwardly and forwardly towards the upper end of said front portion, said upper portion being perforated and constituting said air discharge means, said inlet being situated at the junction between said upper portion and said front portion, said outlet being situated in the lower end of said rear portion adjacent the junction thereof to said front portion, said front portion inclining downwardly and rearwardly towards said rear portion but terminating spaced therefrom and then inclining downwardly and forwardly towards said discharge, said downwardly and rearwardly inclining portion constituting part of said baffle means.

11. A delivery boot for pneumatic delivery systems, said delivery system including a delivery tube for carrying material such as seed and/or fertilizer entrained in air under pressure, said boot being attachable to an associated ground engaging tool carrying shank; said boot comprising in combination an enclosure, an inlet for said enclosure adjacent the upper end thereof, for connecting to the associated tube, an outlet for said enclosure adjacent the lower end thereof, air discharge means in said enclosure remote from said outlet and baffle means in said enclosure for separating the entrained material from the air under pressure whereby said material is directed to said outlet and said air is directed towards said air discharge means, said enclosure including a pair of spaced and parallel side plates and a perimetrical wall joining said side plates by the edges thereof, said wall when viewed in side elevation including a front portion, a rear portion, a lower portion extending from the lower end of said rear portion and curving downwardly and forwardly to the lower end of said front portion and an upper portion extending from the upper end of said rear portion and inclining upwardly and forwardly towards the upper end of said front portion, said upper portion being perforated and constituting said air discharge means, said inlet being situated at the junction between said upper portion and said front portion, said outlet being situated in the lower end of said rear portion adjacent the junction thereof to said front portion.

12. The boot according to claim 11 in which said enclosure means includes a front wall, a rear wall and sides, said baffle means includes a substantially transversely situated baffle extending between said sides and partially across said enclosure and inclining slightly downwardly from the front wall of the enclosure towards the rear wall thereof to receive said material and slow down the velocity thereof and to deflect the air towards said air discharge means, said material moving by gravity downwardly towards said outlet.

13. The boot according to claim 11 in which said baffle means includes a substantially vertical baffle extending from between said inlet and said air discharge means, downwardly towards the lower end of said enclosure but terminating at a point spaced above said lower end, said substantially vertical baffle dividing the portion of said enclosure into which said vertical baffle extends, into an inlet throat portion and an air discharge portion.

14. The boot according to claim 13 in which said transversely situated baffle extends from the front wall of said enclosure and terminates at a point spaced from the rear wall of said enclosure.

15. The boot according to claim 11 in which said inlet includes a downwardly extending conduit secured to said inlet means and having an open lower end, said conduit terminating at a point spaced above said transversely situated baffle and constituting part of said baffle means, and acting as an inlet throat portion with the remainder of said enclosure above said transversely situated baffle means constituting an air discharge portion.

16. The boot according to claim 11 in which said outlet includes a pair of apertures, a V-shaped deflector situated below said apertures for dividing the material into two distinct streams, and shield means extending downwardly from the lower end of said enclosure forwardly of said V-shaped deflector.

* * * * *